United States Patent [19]

in't Veld

[11] 4,014,795

[45] Mar. 29, 1977

[54] OIL BOOM FOR COLLECTING AND SKIMMING OIL ON A WATER SURFACE

[75] Inventor: Cornelis in'tVeld, Vlaardingen, Netherlands

[73] Assignee: National Marine Service, Inc., St. Louis, Mo.

[22] Filed: Nov. 24, 1975

[21] Appl. No.: 634,505

[52] U.S. Cl. .............................. 210/242 R; 61/1 F; 210/DIG. 25

[51] Int. Cl.$^2$ ......................................... E02B 15/04

[58] Field of Search ...................... 210/83, 84, 242; 61/1 F

[56] References Cited

UNITED STATES PATENTS

| | | | |
|---|---|---|---|
| 3,563,380 | 2/1971 | Thomas | 210/242 |
| 3,685,296 | 8/1972 | Bogasian | 61/1 F |
| 3,702,657 | 11/1972 | Cunningham et al. | 61/1 F |
| 3,779,382 | 12/1973 | Steltner | 210/83 |
| 3,834,538 | 9/1974 | Laman | 210/242 |
| 3,886,750 | 6/1975 | Ayers et al. | 61/1 F |

Primary Examiner—Theodore A. Granger
Attorney, Agent, or Firm—Bacon & Thomas

[57] ABSTRACT

An oil boom for sweeping and collecting oil from the surface of a body of water is constructed of a framework of structural members arranged in the form of a box beam, the framework supporting two parallel rows of floating barrier screen panels and being connected to end floats. Flow diverter vanes beneath the barrier screen panels cause a surface transport current to flow between the two rows of the panels towards a surface skimmer located adjacent one end of the boom when the boom is towed in a direction transversely of its length across a body of water to be swept. The forwardmost row of barrier screen panels sweeps floating oil on the water surface towards the skimmer, and the transport current carries oil that is caught in the underflow beneath the forwardmost row of panels towards the skimmer. Extension arms including floating vertical barrier screen panels are pivotally attached to the boom to extend the sweep area, the arms being foldable inwardly against the central boom structure for stowage of the boom.

11 Claims, 10 Drawing Figures

OIL BOOM FOR COLLECTING AND SKIMMING OIL ON A WATER SURFACE

BACKGROUND OF THE INVENTION

The use of various floating apparatus arranged to be towed by a vessel for containing, collecting and skimming floating contaminants such as oil from the surface of a body of water is known in the prior art relating to the field of water pollution control. Reference can be made to U.S. Pat. Nos. 3,221,884, 3,369,664, 3,476,246, 3,686,870 3,771,662, 3,688,506 and 3,886,750 for examples of such apparatus.

Examples of floating oil pollution collection vessels can be seen in U.S. Pat. Nos. 2,876,903, 3,656,619, 3,682,316, 3,844,944 and 3,708,070.

An example of a floating surface skimmer having a float controlled inlet is also exemplified in Swiss Pat. No. 379,104 granted Aug. 14, 1964 to O. PAUSER.

All of the foregoing are intended to illustrate the field of the present invention and to illustrate certain prior art that is already known to applicant. Collectively they describe how oil booms of the type disclosed herein operate and the objectives that are normally sought when one undertakes to contain and remove surface contaminants such as oil from a body of water. They also illustrate various design considerations that must be taken into account in constructing floating oil contaminant collection and skimming devices.

This invention specifically is an improved oil boom construction of the general type disclosed in the present inventor's application Ser. No. 582,271, filed May 30, 1975, entitled "Oil Boom", this being a continuation of application Ser. No. 422,603, filed Dec. 3, 1973, now abandoned.

BRIEF SUMMARY OF THE INVENTION

The present invention relates to a floating oil boom or skimmer that is intended to be towed by a vessel across the surface of a body of water to be cleared of floating oil contaminant.

The oil boom is considered to be unique in its construction, which comprises a central structural framework generally in the form of a box beam which provides a rigid support for a least a pair of rows of surface barrier screen panels that are each individually supported for vertical sliding motion within the framework. Each of the panels making up the barrier screens are buoyant and float on the surface of the water with their bottom edges submerged a predetermined depth below the maximum thickness of surface contaminant expected to be encountered. A float member at opposite ends of the central framework provides natural buoyancy for the boom and a pair of extension arms for the boom, the arms also including floating barrier screen panels, and extend the sweep area of the central boom in an adjustable manner. The extension arms themselves include float elements at their extremities. The construction of the barrier screens enables the individual panels to move vertically in response to wave action on the surface of the body of water in which the boom is operating while yet maintaining an effective barrier for containing oil or other contaminant floating on the surface of the water.

The present invention further contemplates the provision of flow deflector or diverter vane means located below the barrier screens and oriented to induce a lateral surface transport current between the barrier screens, which transport current carries any oil underflowing the forwardmost screen of the oil boom and rising to the surface between the screens to a surface skimmmer unit located towards one end of the boom. The boom is arranged to be towed in a direction extending transversely of its longitudinal axis to sweep floating oil towards the surface skimmer, with the surface transport current being utilized to carry oil caught up in the underflow beneath the forwardmost screen to the skimmer unit.

The boom produces a remarkably clean sweep of surface contaminant due to its unique construction, with virtually no underflow of oil beneath the boom. The skimmer unit also is of unique construction and comprises a self-regulating unit that efficiently allows removal of a thin layer of surface water only through a suction hose connected to a suitable sweeper vessel utilized to tow the boom. Moreover, a surface flow control vane element such as described in the inventor's co-pending U.S. application Ser. No. 527,293, filed Nov. 26, 1974, now abandoned, is also incorporated in the present boom construction for the purpose of optimizing flow of surface water to the skimmer unit.

DETAILED DESCRIPTION OF A PREFERRED EMBODIMENT OF THE INVENTION

Description of the Drawings

With reference to the appended drawings:

FIG. 5 is an enlarged vertical sectional view taken along line 5—5 of FIG. 2;

FIG. 8 is an enlarged vertical sectional view taken along line 8—8 of FIG. 2;

FIG. 9 is a view taken along line 9—9 of FIG. 8; and

With reference to FIG. 1, the oil boom of the present invention is generally indicated at 10 and is shown rigged for towing by a sweeper vessel 12. The boom 10, as will be described in more detailed below, is intended to operate in the manner of the oil boom described in the inventor's co-pending U.S. application Ser. No. 582,271, filed May 30, 1975, the contents of which are incorporated herein by reference. More specifically, the present oil boom generally comprises a double row of parallel barrier screen elements arranged to be towed in a direction transversely of its longitudinal axis as illustrated in FIG. 1. Outwardly extendable arm units 14 are also provided for increasing the width of the sweep of the boom along the surface of a body of water to be skimmed of a floating contaminant.

Figure 1:
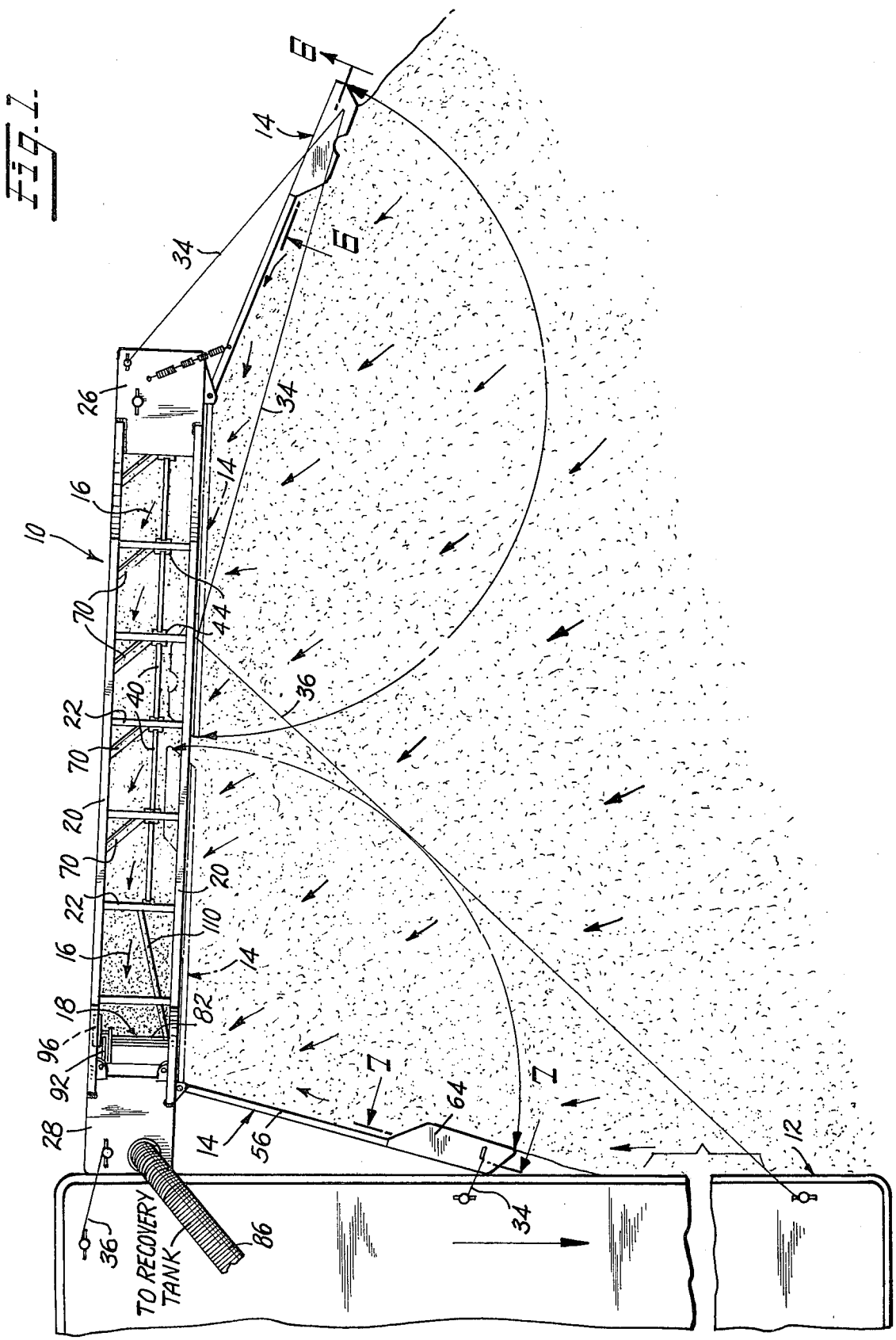
FIG. 1 is a diagrammatic plan view of the oil boom embodying the present invention in its towing position, with the boom extensions shown extended in solid lines and in retracted position in phantom lines.

The present invention further utilizes the principle disclosed in the prior application of inducing a surface transport current generally indicated by arrows 16 which flows in a direction parallel to the longitudinal axis of the boom between the barrier screens to carry contaminant located between the barrier screens to a skimmer unit 18 located adjacent one end of the boom. The contaminant, which may be referred to herein as oil, since this is the contaminant usually intended to be swept from the water's surface, floats as a film on the water, and is pushed to the skimmer 18 by the forwardmost barrier screen of the boom unit. Any oil caught up in the underflow beneath the forwardmost barrier will rise to the surface immediately aft thereof between the two barrier screens and will be swept to the skimmer 18 by the surface transport current 16. The system of parallel, double barrier screens and transport current has been found to produce a remarkably clean sweep of surface contaminant such as oil, and the present invention relates to an improved model of the more basic oil boom construction described in the earlier patent application referred to above.

With reference to FIGS. 1–5, oil boom 10 comprises a rigid framework preferably formed of lightweight structural tubular and channel members that are welded or otherwise fastened together to provide an elongated box beam construction of horizontal top and bottom stringers 20, cross braces 22 and vertical struts 24, including vertical structural channel members 44 and 46.

End floats 26 and 28 are connected to the ends of the framework to complete the basic boom assembly. Hingedly mounted to the end floats 26 and 28 are extension arms 14 which are illustrated in deployed condition in FIGS. 1 and 2. The arms can be folded back against the boom framework for transport or stowage as shown in phantom lines in FIG. 1. Lines 34 can be arranged to retain the arms 14 in desired position when the boom is set up for a sweep while under tow. Lines 36 can be used to secure the boom to the towing vessel 12. The angle of the boom 10 relative to the vessel 12, of course, can be varied to suit the conditions encountered during a sweep and the sweep velocity.

Figure 2:
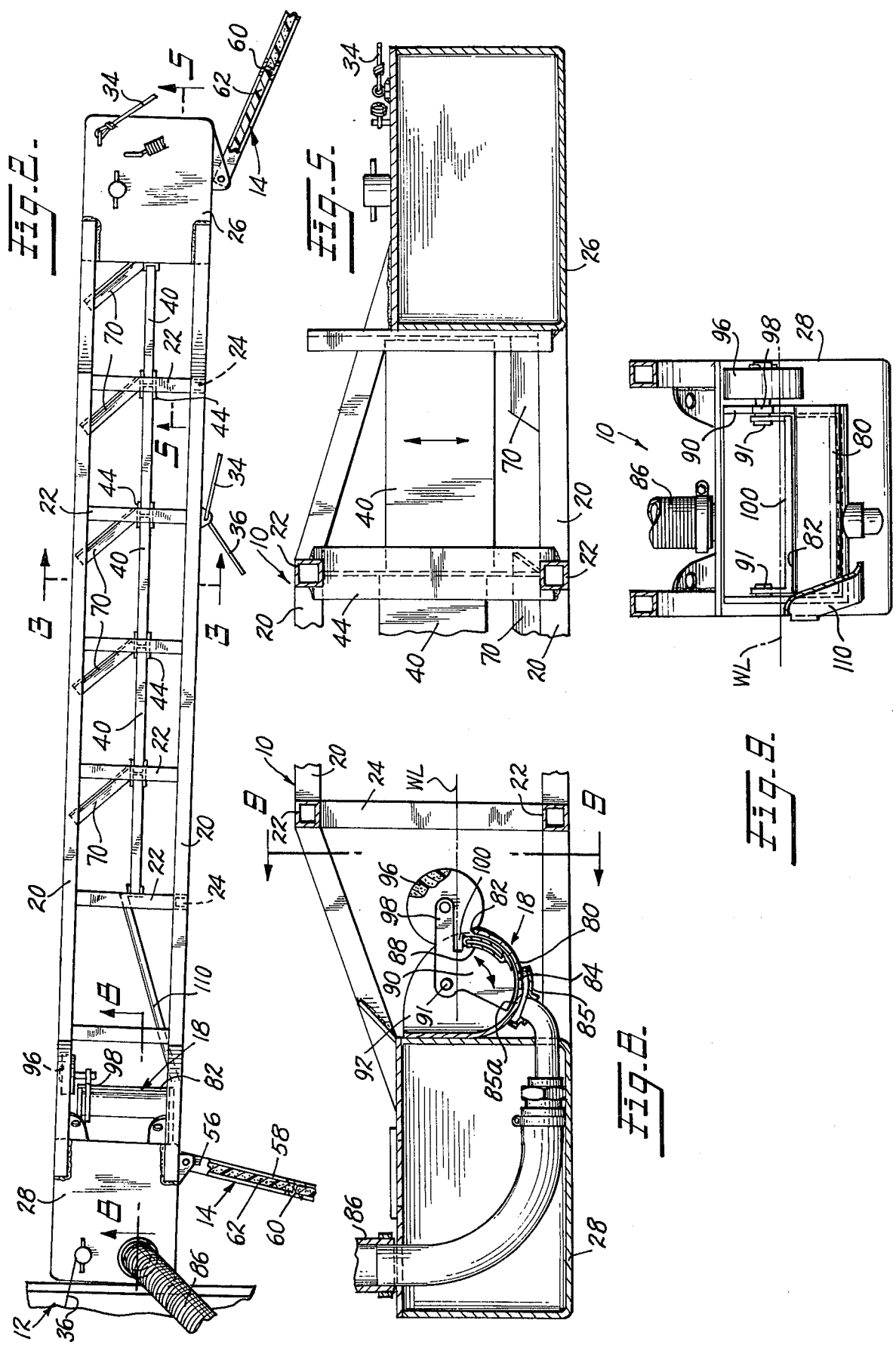
FIG. 2 is an enlarged fragmentary plan view of the floating boom shown in FIG. 1.
Figure 3:
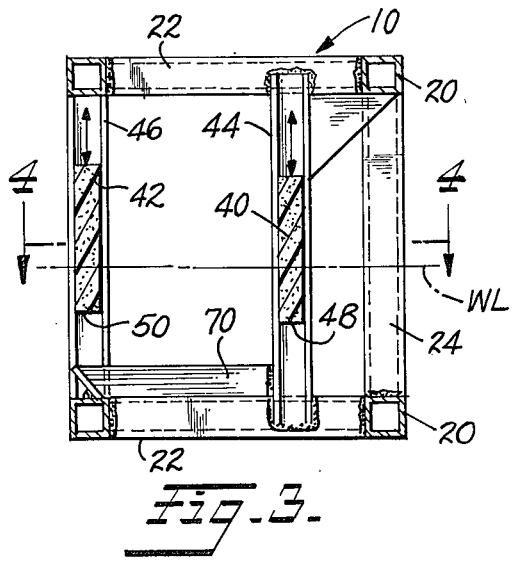
FIG. 3 is an enlarged sectional view taken along line 3—3 of FIG. 2.
Figure 4:
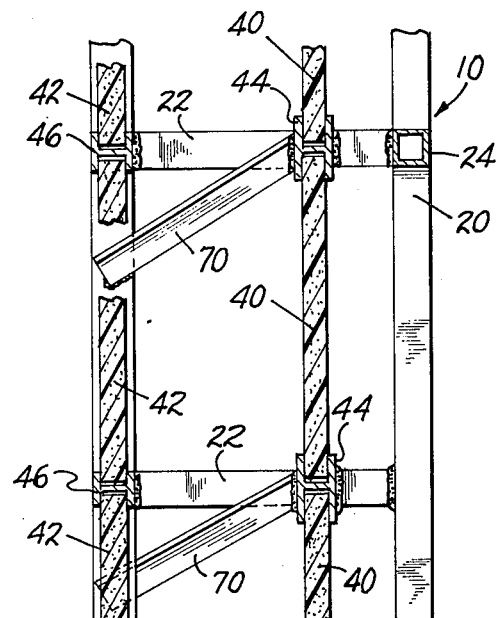
FIG. 4 is a horizontal sectional view taken along line 4—4 of FIG. 3.

As best seen in FIGS. 2 and 3, the oil boom of the present invention is provided with at least two parallel rows of forwardmost and aftermost vertical panels 40 and 42 disposed vertically in sliding relationship between upright channel members 44 which support the panels 40 and 42. The panels 40 and 42 are lightweight, buoyant members that vertically float in the water being swept with the water line at approximately the line WL indicated in FIG. 3. In this condition, the panels 40 and 42 are each free to follow wave action by sliding up and down in channel members 44, 46, while the bottoms of the panels 48, 50 constantly remain submerged below the maximum depth of floating contamination, which often is no more than a film on the water's surface. The parallel rows of panels 40, 42 constitute surface barrier screen assemblies, with the extendable arms 14 in effect forming an extension of the series of forwardmost panels 40.

It will be readily observed that wave action will be transmitted to the end floats 26 and 28, while the central oil boom framework remains relatively insensitive to wave action. The individual panels 40 and 42 forming the surface barrier screen will each individually respond to wave action without transmitting bending loads to the oil boom framework. Thus, the boom is extremely seaworthy and stable, with few points of stress build-up arising from the operation of the boom in the presence of waves.

Figure 6:
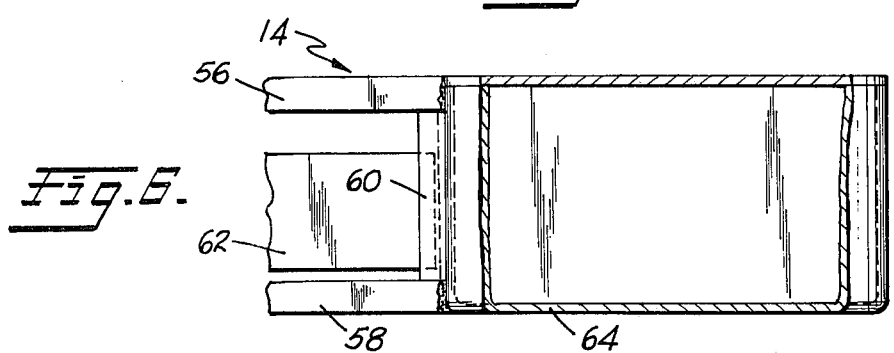
FIG. 6 is an enlarged vertical sectional view taken along line 6—6 of FIG. 1.
Figure 7:
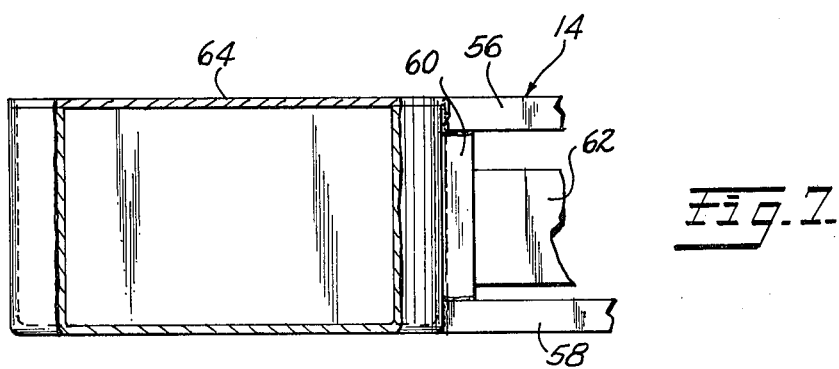
FIG. 7 is an enlarged vertical sectional view taken along line 7—7 of FIG. 6.
Figure 10:
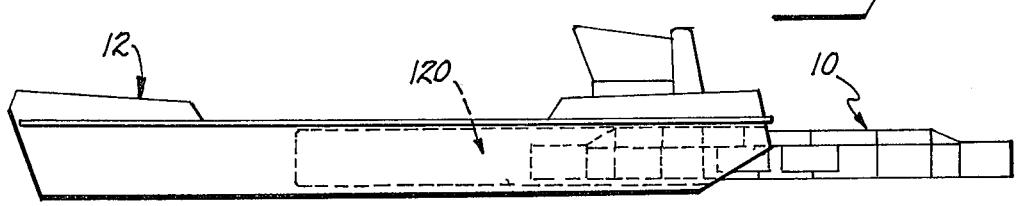
FIG. 10 is a diagrammatic side elevational view of a sweeper vessel intended for use with the oil boom, and shows the boom partially stowed in the vessel.

The arms 14 (see FIGS. 1, 6 and 7) are made up of top, bottom and vertical frame members 56, 58 and 60, respectively, with vertical members 60 constituting channel guides for buoyant panels 62 that are arranged in a manner similar to the panels 40. The arms 14 of the boom are also provided with flotation elements 64 at their extremities, the float 64 being suitably tied structurally to the frame members 56 and 58. The outwardly positioned arms with their floats stabilize the control boom structure when it is being towed much like outrigger floats on a small boat. The arms furthermore are adjustable to close any gap occurring between the vessel 12 and adjacent end of the boom, as well as to provide an effective rudder-like stabilizing effect on the boom while it is under tow, this latter characteristic being best obtained by angular adjustment of the outer arm 14 remote from vessel 12.

In the lower part of the boom 10, there are provided deflector vanes 70 that preferably are flat, inclined plates mounted at an angular relationship with respect to the boom framework below the barrier screen panels 40 and 42. The vanes, as can be seen in the drawings, extend diagonally across the area between the foremost amd aftermost panels 40 and 42, whereby flow of water beneath the panels is diverted upwardly and laterally towards the skimmer 18. The upward and lateral deflection of this water ultimately results in the inducement of a surface transport current flowing generally in the direction of arrows 16 in FIG. 1.

During towing of the boom, or when the boom is fixed in a moving current, sub-surface flow of water striking the vane 70 is diverted upwardly and towards skimmer unit 18 between the barrier screens. The resulting surface transport current 16 carries with it surface contaminant that may have been caught up in the underflow beneath the forwardmost barrier screen panels 40. Thus, floating oil is first swept towards the skimmer 18 by means of the screens 62 in the outwardly extending arms of the oil boom and by the forwardmost screen panels 40. Since a slight amount of oil contamination invariably manages to become entrained in the underflow beneath the forwardmost screen assembly, in the absence of any provision for removal of this oil as it rises to the surface aft of the most forward screen assembly, the sweeping efficiency of the oil boom would be impaired. The surface transport current induced by the vane 70, however, causes the surface water between the barrier screen assemblies to flow towards the skimmer, which then removes the surface mixture flowing to it in this area as well as the surface mixture that has been swept to it by the forwardmost barrier screen assembly. Another benefit and advantage obtained from the diverter vanes 70 arises from the general increase in level of surface water between the screens 40 and 42. The higher level of water, of course, results from the upward deflection of oncoming surface water by the vanes 70. The higher water level behind the forward screen panels 40 tends to balance the panels against the pressure of oncoming surface current so that they are subjected to less unbalanced frontal pressure. This enables the use of a lighter panel structure and tends to improve the ability of the panels 40 to slide in the channel members 44 while the boom is being towed to thereby follow wave action in open water.

The skimmer 18 is of unique construction (see FIGS. 8 and 9) and comprises a sump 80 having an upper front lip 82 and a drain 84 in its bottom. Suction line 86 is connected to a suction pump (not shown) in sweeper vessel 12 and to the drain 84 through manifold 85. A buoyant weir 88 is supported by end plates 90 that are pivotally mounted at 91 to end walls 92 of sump 80. The closure 85a closes the manifold 85 except for drain opening 84 which is elongated, like manifold 85 and extends over substantially the width of the sump 80. A secondary float element 96 is rigidly connected to end plate 90 by extension 91 of end plate 90. The buoyancies of weir 88 and float 96 are adjusted so that, in calm water, the top lip 100 of weir 88 lies just below the surface of the water. Thus, as the water flows over the lip 100 of weir 88, and with the suction pump operating to create suction in conduit 86, weir 88 floats upwardly about pivot 91 as the sump 80 fills with water. Water will then be sucked through conduit 86 and drain opening 84, lowering the level of water in the sump 80. The weir 88 subsequently pivots downwardly letting in more water over the lip 100 and the cycle is repeated until the system stabilizes itself so that a constant skimming effect is achieved at the surface of the water which is indicated by the line WL in FIG. 8 High or low rates of suction through conduit 86 are automatically compensated for by the floating weir 88 being responsive to the level of water in sump 80.

When the skimmer encounters wave action, the float 96 extending in front of the skimmer 18 rises with the crest of the wave to lift lip 100 with the crest while the lip itself remains just below the surface of the wave water. Suction through drain opening 84 continues while the trough of the wave is sensed by float 96. Weir 88 will then adjust itself in response to flotation forces acting on it from within sump 80 and the action of float 96 in the trough of the wave so that skimming action continues without substantial flooding of the sump 80, and in response to the level of water in the sump at all times.

Adjacent the end of the boom where the skimmer 18 is located, there is also provided a flow control vane 110 (see FIGS. 2 and 9) which is the subject of applicant's co-pending U.S. patent application Ser. No. 527,293, filed Nov. 26, 1974, the disclosure contained therein being hereby incorporated by reference in this application. Vane 110, as described in that application, serves to create a stable pool of surface water directly aft of the vane and in front of the skimmer 18, the pool having a lower surface level than surrounding water. Surface water therefore tends to flow into the pool over the vane 110 and from between the barrier screen assemblies. The flow from between the barrier screen assemblies, of course, is aided by the surface transport current indicated at 16. The upper edge of the vane 110 is normally adjusted so that it lies just below the water surface which is indicated by the line WL in FIG. 9.

The sweeper vessel 12 preferably is provided with a compartment 120 in the lower area of its hull that is in communication with surrounding water. The compartment 120 is normally flooded when the vessel 12 is afloat and is of a size sufficient to accommodate the oil boom endwise when the boom is rigged for stowage, with the extension arms folded inwardly. Thus, the boom can be stowed and transported within vessel 12 without the necessity of raising the boom from the water or of towing same in open water. Suitable winches and guide lines, of course, may be provided within vessel 12 to enable efficient and rapid stowage or deployment of the oil boom.

It should be understood that the oil boom of the present invention may be constructed with more than two barrier screen assemblies, in which case a suitable array of flow diverter vanes 70 would be provided beneath the screen panels 40 to induce a surface transport current between each of the barrier screen assemblies. Also, while the boom is illustrated in a configuration suitable for towing by a vessel, the boom could just as well be secured at an angle to a moving current, such as in a river, to sweep surface contamination towards skimmer 18. In such an arrangement, any suitable suction means could be applied to conduit 86, including a pump located on land.

The foregoing description of a preferred embodiment is intended to be illustrative of the invention, which invention is not intended to be limited by such description beyond the scope of the appended claims.

I claim:

1. An oil boom for collecting and skimming surface oil floating on a body of water, the boom comprising at least two generally parallel, elongated surface barrier screens having a density sufficient to cause the screens to float in water with a draft at least slightly greater than the maximum thickness of the floating oil layer; means for supporting the barrier screens within a surface current of water flowing towards the barrier screens in a direction generally transversely of their longitudinal direction; and flow diverter means located beneath the barrier screens for diverting at least a portion of said surface current towards one end of the boom and between said barrier screens, said flow diverter means comprising at least a single inclined flow diverting deflector element having at least a portion thereof angularly oriented relative to the principal horizontal and vertical axes of the oil boom, whereby oncoming surface current flowing towards the deflector element is diverted upwardly and laterally towards one end of the boom.

2. An oil boom as recited in claim 1, wherein said barrier screens each comprise an assembly of generally vertical buoyant panels supported in end-to-end relationship in a manner enabling their individual vertical movement in response to flotation forces by said supporting means.

3. An oil boom as recited in claim 2, wherein said supporting means include vertical guide channel members slidably engaging the ends of the panels, the panels comprising generally rigid, flat sheet elements.

4. An oil boom as recited in claim 1, wherein said flow diverter means comprises a plurality of parallel diverter vane members, each of said vane members comprising an inclined flow diverting deflector element having at least a portion thereof angularly oriented relative to the principal horizontal and vertical axes of the oil boom, whereby oncoming surface current flowing towards the deflector elements is diverted upwardly and laterally towards one end of the boom.

5. An oil boom as recited in claim 1, further wherein said oil boom includes at least one extension arm pivotally attached to one end of the boom for broadening the water surface sweep area of the boom, said arm comprising at least a single barrier screen having a density sufficient to cause the screen to float in water with a draft at least slighty greater than the maximum thickness of the oil layer, the extension arm being foldable inwardly against the oil boom when the boom is inoperative, whereby the boom and arm can be compacted in overall length for stowage purposes, and being adjustable for varying its angular relationship with the oil boom during operation of the boom.

6. An oil boom as recited in claim 5, wherein said single barrier screen of said extension arm further comprises vertically and independently supported buoyant panel members arranged end-to-end, and channel support means slidably engaging the individual ends of said panel members.

7. An oil boom as recited in claim 6, further including a float element rigidly connected to the distal end of said arm.

8. An oil boom as recited in claim 1, further including a surface water skimming means adjacent said one end of the oil boom, the skimming means having an inlet in communication with surface water carried to it by the diverted surface current.

9. An oil boom for collecting and skimming surface oil floating on a body of water, the boom comprising a rigid central framework of longitudinal stringers, transverse cross braces and vertical struts; float means rigidly connected to each end of the central framework; at least two rows of adjacent, vertical panels supported by and extending between at least several of the vertical struts in end-to-end relationship parallel to the longitudinal axis of the boom, the panels forming the surface barrier screens having a density sufficient to cause them to float vertically in water with a draft at least slightly greater than the maximum thickness of the floating oil; the panels further being individually supported for free vertical floating movement by said vertical struts; a plurality of flow diverter vanes located below said panels, said vanes comprising flow deflector elements angularly oriented relative to the principal horizontal and vertical axes of said central framework, and secured thereto so that they extend diagonally across the vertical planes including said rows of panels, whereby vanes will divert an oncoming current striking them upwardly and towards one end of the boom, and whereby the diverted current will form a surface transport current between the barrier screens flowing towards said one end of the boom, the transport current having an elevated surface level relative to ambient water; and surface water skimmer means located adjacent said one end of the boom, said skimmer means having an inlet in communication with surface water carried to said one end of the boom by said transport current.

10. An oil boom for collecting and skimming surface oil floating on a body of water, the boom comprising at least two generally parallel, elongated surface barrier screens having a density sufficient to cause the screens to float in water with a draft at least slightly greater than the maximum thickness of the floating oil layer; means for supporting the barrier screens within a surface current of water flowing towards the barrier screens in a direction generally transversely of their longitudinal direction; and flow diverter means located beneath the barrier screens for diverting at least a portion of said surface current towards one end of the boom and between said barrier screens, wherein said barrier screens each comprise an assembly of generally vertical buoyant panels supported in end-to-end relationship in a manner enabling their individual vertical movement in response to flotation forces by said supporting means.

11. An oil boom as recited in claim 10, wherein said supporting means include vertical guide channel members slidably engaging the ends of the panels, the panels comprising generally rigid, flat sheet elements.

* * * * *